Aug. 20, 1968  F. A. SUMMERLIN  3,398,386
ELECTRICAL SYNCHRO HAVING ONE SURFACE OF THE ROTOR INCLINED
Filed April 20, 1966

INVENTOR
FREDERICK A. SUMMERLIN
BY
Watson, Cole, Grindle & Watson
ATTORNEYS

United States Patent Office 3,398,386
Patented Aug. 20, 1968

3,398,386
ELECTRICAL SYNCHRO HAVING ONE SURFACE OF THE ROTOR INCLINED
Frederick A. Summerlin, 58 Townsend Lane,
Harpenden, Hertfordshire, England
Filed Apr. 20, 1966, Ser. No. 544,002
Claims priority, application Great Britain, Apr. 20, 1965,
16,607/65; May 11, 1965, 19,900/65
8 Claims. (Cl. 336—135)

ABSTRACT OF THE DISCLOSURE

This invention relates to an electrical synchro wherein the stator has pairs of poles wound to produce no axial flux flow and the rotor is an unwound iron body of cylindrical shape having one end surface inclined to the rotor axis. Rotation of the rotor results in a constant sum of rotor areas being exposed to opposite poles.

---

Figure 1:
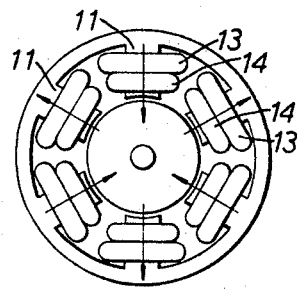

This invention relates to electrical devices comprising a wound stator and a rotor and arranged to be energised from an electrical supply and to produce an output dependent on the angular position of the rotor.

Usually the rotor is a wound rotor and this necessitates the use of slip rings or injection transformers to obtain the output and an object of the invention is to provide a device without a winding on the rotor so that slip rings and injection transformers are not necessary and so that slot ripple errors do not arise.

According to the present invention an electrical device comprises a wound stator and an unwound rotor, the stator having at least two pairs of wound circumferentially disposed poles or teeth and the rotor being a member of ferromagnetic material which is nonuniform about the rotor axis whereby the division of flux between the poles of a pair of the stator is dependent upon the angular disposition of the rotor.

By turning the rotor, the division of flux between stator poles can be changed due to the shape of the rotor so that the output signal is varied.

The device has no slip rings and only has windings on its stator and the rotor has no slots so that there are no ripple effects.

The device can be easily manufactured because two types of standard coil can be placed in position complete with little distortion reducing the likelihood of open circuits and the necessity to have skilled winders.

Moreover the stator can be built up from stamped laminations to avoid complicated machining and inaccuracies can be avoided by having the stator poles of greater axial width than the rotor, if as is preferred, flux flows radially and circumferentially rather than axially.

In spite of the simple construction, many inaccuracies are avoided.

Preferably the rotor is a generally cylindrical body having at least one end face in a plane oblique to the rotor axis so that the changing area of rotor under a stator pole will vary sinusoidally with the angular position of the rotor. The other end face may be perpendicular to the rotor axis and meet the oblique face at the rotor circumference so that the axial width of the rotor is a minimum at this one point on the circumference.

In one arrangement alternate stator poles are wound and unwound so that unwound poles on either side of a wound pole provide return flux paths, but preferably the unwound poles are omitted and use is made of the balance of the flux.

A wound pole conveniently carries both an exciting winding and a signal winding and in a preferred arrangement the exciting windings on a pair of wound poles are connected in series.

The signal windings are also connected in series but the connection between them is reversed so that if the total voltage applied to the series connection of two exciting windings is V which is equal to $V_1 + V_2$, where $V_1$ and $V_2$ are the voltages across the individual exciting windings, the induced voltage in the winding formed by the series connection of two signal windings will be proportional to $(V_1 - V_2)$.

There may be two, three or more, pairs of wound poles.

Figure 2:
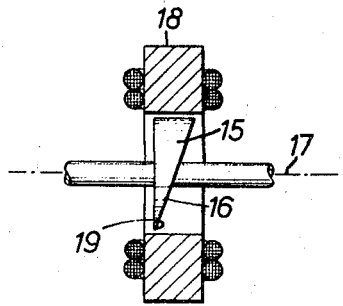
Figure 3:
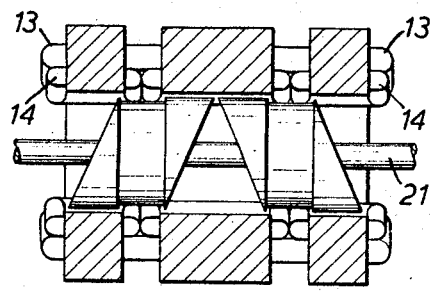
Figure 4:
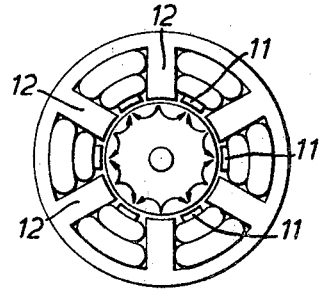
Figure 5:
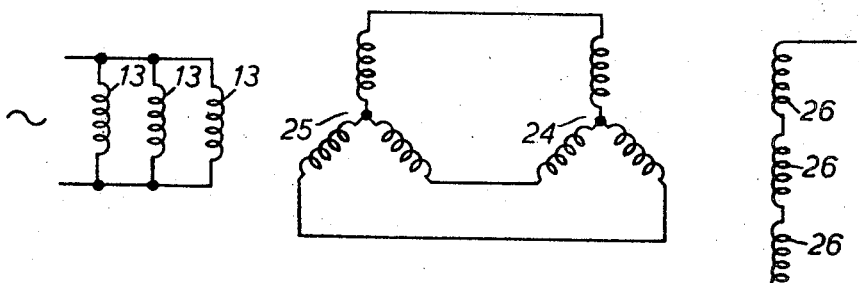

The invention may be carried into practice in various ways and one embodiment will now be described by way of example with reference to the accompanying drawings of which:

FIGURE 1 is a diagrammatic section of a preferred synchro embodying the invention, FIGURE 2 is a sectional elevation of the synchro of FIGURE 1, FIGURE 3 shows how a number of synchros can be connected together with their rotors on a common shaft to compensate for errors of misalignment of the rotor axis, FIGURE 4 is a section similar to FIGURE 1 of an alternative form of synchro, and FIGURE 5 is a circuit diagram showing how the windings can be connected together in one application of the synchro.

The synchro of FIGURE 1 has a laminated stator with six radial poles 11.

Each pole 11 of each opposite pair of poles carries both an exciting coil 13 and a signal coil 14 and the coils 13 on an opposite pair of poles 11 are connected in series and so are the coils 14. If a voltage V is connected across a series pair of exciting coils 13, they may have respective voltages $V_1$ and $V_2$ across them where $V = V_1 + V_2$. The signal coils 14 are connected in series so that the voltage across the series combination due to the voltages induced in the coils is proportional to $V_1 - V_2$.

In a preferred arrangement the series connected exciting windings on the three pairs of poles are connected in parallel across an A.C. supply as shown at the left of FIGURE 5, and the three signal windings each comprising a pair of coils 14 one on each opposite pair of poles 11 are connected in star to give a three wire output.

As shown in FIGURE 2 the rotor is solid, of ferromagnetic material with high resistivity, or alternatively it can be built up from laminations. It is in the form of a cylinder 15 having one of its end faces 16 oblique to the rotor axis 17 so that the width of the rotor varies sinusoidally around the rotor axis from a maximum slightly less than the width of the stator 18 to the minimum width possible as shown at 19.

A total flux linking the coils on the poles of an opposite pair is constant in dependence on the exciting voltage but this flux is divided between the two poles in a manner which is dependent on the width of the rotor under each pole so that as the rotor turns, one signal winding will have generated in it a greater voltage while the other will have generated in it a smaller votage and the difference will be sinusoidally related to the rotor angle.

It can be shown that the total area of rotor under the three alternate poles at which flux flows in the same direction in relation to the rotor is the same as the total area of rotor under the other three poles whatever the angular position of the rotor. Also the sum of the areas under opposite poles of a pair is constant. It follows that the flux entering the rotor balances the flux leaving the rotor so that separate poles between the wound poles do not have to be provided for the return flux. However they can be provided if desired as shown in FIGURE 4 where unwound poles 12 alternate with the wound poles 11.

Also, when the signal windings are not loaded, the open circuit impedances of the exciting windings are equal and independent of rotor angular position.

This simple system would be inaccurate if the axes of stator and rotor were not precisely co-incident but the errors could be compensated for by arranging four basic units axially on a common rotor shaft 21 as shown in FIGURE 3. The exciting windings on the four units could be connected in series or parallel and the signal windings could be connected in series for each phase and the three sets of series windings could be connected in star. Compensation should be provided for the amount of movement permitted by conventional ball bearings on the rotor shaft.

There could be individual exciting and signal windings on the individual poles, or, as shown in FIGURE 3, there could be a common set of exciting coils, each coil linking the similar poles of all four units. The two signal windings on the centre units could be in common as shown thus saving one winding.

The stator lamination stacks for the two inner units are combined for convenience, and also, to simplify machining, the outer rotor sections are integral with their corresponding inner rotor sections.

In a usual method of using a conventional synchro, the three voltages obtained from the rotor windings whether by way of slip rings or injection transformers:

$$V \cos \theta_x, \quad V \cos \left(\theta_x - \frac{2\pi}{3}\right)$$

and $$V \cos \left(\theta_x + \frac{2\pi}{3}\right)$$

where $\theta_x$ is the rotor angle of the transmitter synchro, are applied to the three phase exciting windings of a control transformer to induce in its rotor a voltage dependent upon $\theta_T$ which is the control transformer rotor angle in relation to its winding measured from a datum displaced by $\pi/2$ from the datum of the synchro transmitter in relation to its winding.

This voltage is:

$$V^1 \cos \theta_x \sin \theta_T + V^1 \cos \left(\theta_x - \frac{2\pi}{3}\right) \sin \left(\theta_T - \frac{2\pi}{3}\right)$$

$$+ V^1 \cos \left(\theta_x + \frac{2\pi}{3}\right) \sin \left(\theta_T + \frac{2\pi}{3}\right)$$

where $V^1 = KV$.

A precisely equivalent voltage to this can be generated from the signal windings on the stator of a second synchro according to the invention by connecting the exciting windings 24 of the second synchro in star to the signal windings 25 of the transmitter and by connecting the signal windings 26 of the second synchro in series as shown in FIGURE 5.

The signal and exciting windings may be interchanged in the control transformer and this may be desirable when torque reaction between control transformer and control transmitter when a misalignment is present needs to be kept to a minimum. However this is not essential and the same connections as in the control transmitter can be used.

The three line output of the control transmitter and the three line input of the control transformer could equally well be connected in delta.

It may be noted that the exciting coils of the control transformer do not necessarily have to have the same number of turns as the coils of the control transmitter.

A single somewhat similar unit could be used as a resolver if it had only two pairs of opposite poles and two sets of exciting and signal windings at right angles, with the part exciting windings and part signal windings connected together in the same sense as described above. Voltages proportional to $V \cos \theta_T$ and $V \sin \theta_T$ can be produced.

The rotor shape could be modified so that the area under a pole increases linearly with the rotor angle, and then a pick-off giving a linear output would be obtained.

If the arrangement of FIGURE 5 were modified so that the A.C. supply was connected across the signal windings 26 as well as to the exciting windings 13, a torque unit would be obtained, in which a movement of one rotor would be reproduced at the other.

What I claim as my invention and desire to secure by Letters Patent is:

1. An electrical device comprising a stator and an unwound rotor, the stator having pairs of wound circumferentially-disposed poles and the rotor being a member of ferromagnetic material which is cylindrical about the rotor axis having one end surface inclined to a plane perpendicular to the rotor axis for dividing flux between the poles of a pair on the stator in dependence upon the angular disposition of the rotor.

2. A device as claimed in claim 1 in which each wound pole carries both an exciting winding and a signal winding.

3. A device as claimed in claim 2 wherein the exciting windings on a pair of wound poles are connected in series and the signal windings on that pair of poles are connected together so that the induced voltages are subtracted from each other.

4. A device as claimed in claim 2 having three pairs of wound poles.

5. A device as claimed in claim 2 in which the stator comprises stacked laminations.

6. A device as claimed in claim 1 in which the stator poles have greater axial width than the rotor.

7. An electrical device according to claim 1 wherein the other rotor face is perpendicular to the rotor axis and intersects the inclined face of the rotor at a point on the rotor circumference.

8. An electrical device according to claim 7 wherein the sum of the rotor areas exposed to opposite pole faces is a constant.

References Cited

UNITED STATES PATENTS

| | | | |
|---|---|---|---|
| 2,494,493 | 1/1950 | Schaeuitz | 336—130 |
| 2,839,726 | 6/1958 | Demetriou | 336—120 XR |
| 3,045,196 | 7/1962 | Packard | 336—135 |
| 3,045,227 | 7/1962 | Minas | 336—130 XR |
| 3,085,192 | 4/1963 | Maier | 336—135 XR |
| 3,112,464 | 11/1963 | Rafajski et al. | 310—111 XR |
| 3,155,931 | 11/1964 | Maeda | 336—135 XR |
| 3,172,063 | 3/1965 | Lindstrom et al. | 336—135 |
| 3,281,655 | 10/1966 | Blasingame | 336—135 XR |

LEWIS H. MYERS, *Primary Examiner.*

T. J. KOZMA, *Assistant Examiner.*